July 2, 1940.　　　　G. V. ANDERSON　　　　2,206,523
TEMPERATURE COMPENSATING DEVICE
Filed Oct. 19, 1936　　　2 Sheets-Sheet 1
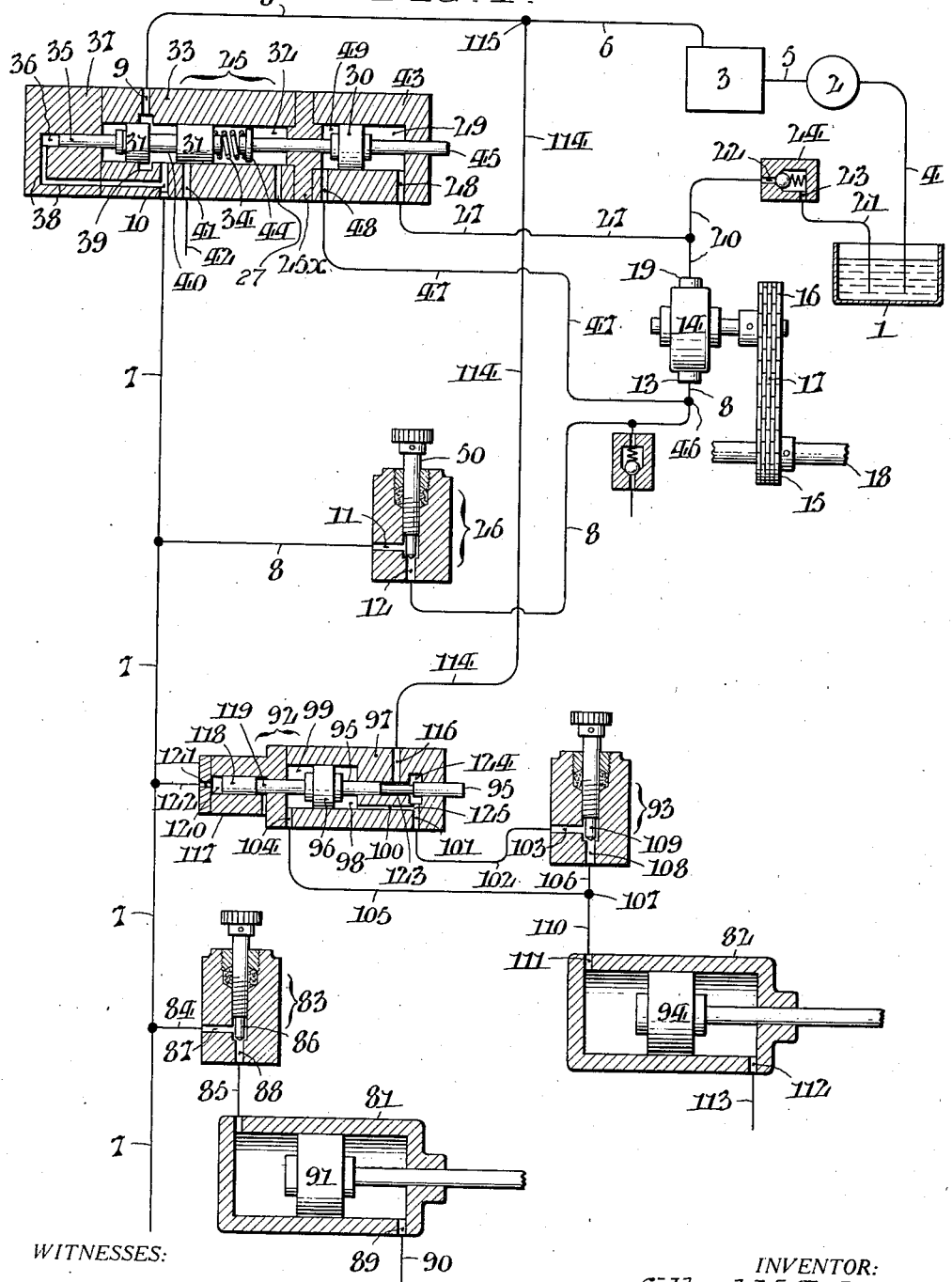
WITNESSES:
John A. Weidler
William Bell, Jr.
INVENTOR:
Gilbert V. Anderson,
BY Bally Paul
ATTORNEYS.

July 2, 1940.  G. V. ANDERSON  2,206,523
TEMPERATURE COMPENSATING DEVICE
Filed Oct. 19, 1936   2 Sheets-Sheet 2
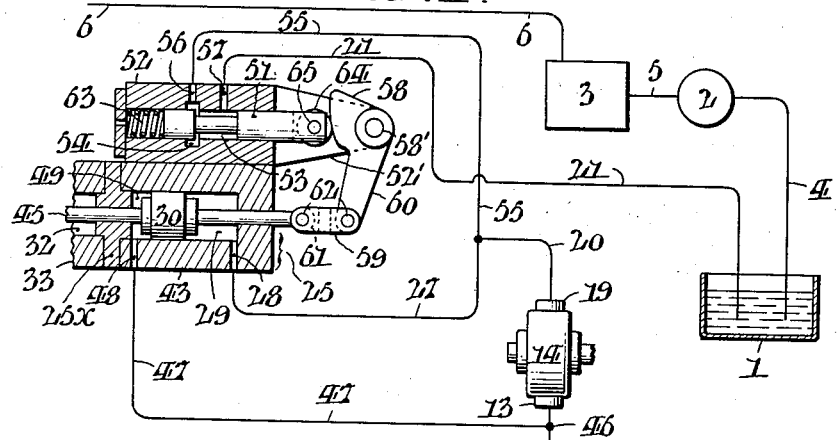
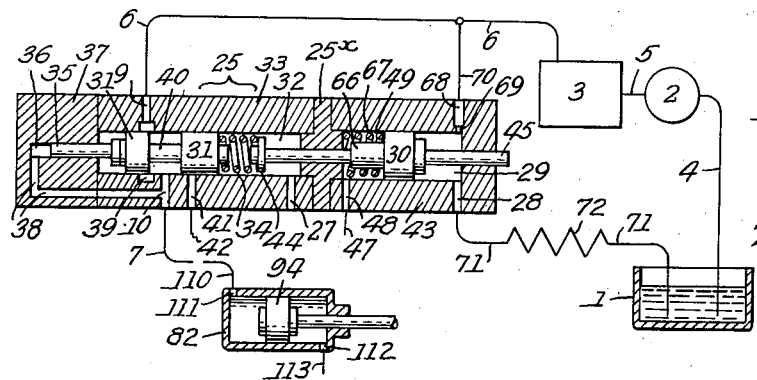
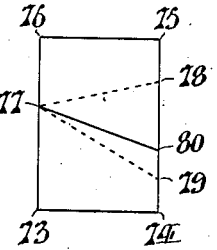
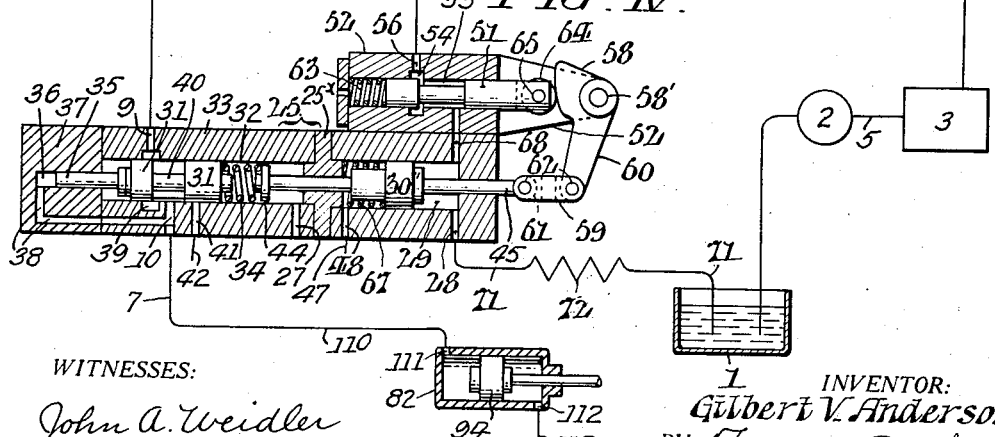
WITNESSES:
John A. Weidler
William Bell, Jr.
INVENTOR:
Gilbert V. Anderson,
BY Fralley Paul
ATTORNEYS.

Patented July 2, 1940

2,206,523

UNITED STATES PATENT OFFICE 2,206,523

TEMPERATURE COMPENSATING DEVICE

Gilbert V. Anderson, Philadelphia, Pa.

Application October 19, 1936, Serial No. 106,386

6 Claims. (Cl. 60—52)

This invention relates to temperature compensating devices and more particularly to such types which are adapted for controlling hydraulic flow and useful in connection with machine tools, or other applications, where a uniform rate of flow is desired regardless of the temperature of the working medium.

Heretofore in many applications of hydraulics, in the operation of machine tools and for other purposes, the liquid warms up after the tool has been in operation a short period of time because of fluid friction and, in some instances, this rise in temperature is quite considerable.

The variation in the rate of flow of the operating liquid due to temperature fluctuations is often a troublesome factor, and the primary object of this invention is to provide a novel means to compensate for such variations in the velocity of flow and to maintain, as nearly a constant rate of flow in the various circuits, of a hydraulically operated machine embodying said invention, as possible regardless of any rise or fall in the temperature of the working fluid.

Other objects and ancillary advantages of this invention are more fully set forth hereinafter, said invention essentially consisting in certain combinations of instrumentalities and features of construction, as will be hereinafter disclosed and more specifically defined in the claims at the conclusion of this specification.

For a clear understanding of, and to illustrate practical embodiments of this invention, reference is to be had to the accompanying drawings in which the same characters of reference are employed to designate corresponding parts in all the views.

Fig. I is a diagrammatic sectional view illustrating one form of embodiment of the invention associated with a hydraulic pump and other necessary equipment, said view also illustrating two types of control mechanism usable therewith.

Fig. II is a similar sectional illustration of a modified form of valve to that shown in the preceding view.

Fig. III is a similar illustration of a further modified form of the valve means.

Fig. IV is a corresponding view of a still further modification; and

Fig. V is a diagram of pressures used in describing the action of one of the valves used in this device.

Referring more in detail to Fig. I of the drawings, the reference character 1 represents a reservoir for containing the working liquid which is usually a sump formed in the base of a hydraulically operated machine suitable for embodying the device of this invention. 2 and 3 represent, respectively, the main pump and accumulator for supplying working liquid to the entire machine, and they may be of any suitable type arranged to supply said machine with an adequate amount of the working liquid at the desired constant working pressure. The main pump 2 draws liquid from the reservoir 1 through a delivery pipe 4 and delivers it to the accumulator 3 through a discharge pipe 5. Liquid flows from the accumulator 3 through the connecting pipes 6, 7, 8 and associated passages 9, 10, 11, 12 to the intake connection 13 of a small positive or constant displacement pump 14 which is driven at a definite speed by means of the sprockets 15, 16 and chain 17 from a constant speed shaft 18. Discharge from the positive displacement pump 14 normally flows from the discharge connection 19 through the connecting pipes 20, 21 and associated passages 22, 23 which lead to the sump or reservoir 1. The action of the constant displacement pump 14 in connection with the relief valve 24, the variable pressure reducing valve 25 and an adjusting valve 26 in effecting temperature compensation, will be set forth after a brief description of these component parts is first given.

Relief valve 24 serves to maintain a constant pressure in the discharge line from the displacement pump 14 and in pipe 27 which connects, by way of a passage 28, to the bore 29 at the right of the piston 30, as shown. The pressure for which relief valve 24 is set should be somewhat less than half the working pressure maintained by the accumulator 3. The function of the variable pressure reducing valve 25 is to effect a temperature compensation by means of varying what may be termed the "control pressure" in the main pipe line 7 which connects by branches to the various flow regulating and control valves of the device. A slide valve 31, which reciprocates freely in the bore 32 of the main body section 33 of valve 25 to the left-hand of a separating wall 25x, serves to maintain in the pipe line 7 and all the valves connected therewith a control pressure in direct proportion to the tension of a spring 34 regardless of the amount of liquid that flows through the valve 25; and said bore 32 has an atmospheric exhaust 27 to prevent formation of a vacuum therein. It may be readily seen that if the pressure in pipe line 7 should tend to fall, due to an increase of flow through said pipe from the valve 25 the force exerted on the left-hand end of an auxiliary plunger 35, which is slidable in a smaller bore 36 of an axially aligned body section 37 of said valve, would fall. This force is transmitted to the left-hand end of the auxiliary plunger 35 from the pipe line 7 by way of an angular passage 38. A decrease in the force on the left-hand end of auxiliary plunger 35 would allow spring 34 to move slide valve 31 to the left to open wider communication between an annular groove or port 39 in the body section 33 and an annular groove 40 formed in the slide valve 31, sufficiently to produce this increase in flow and yet maintain a substantially constant control pressure in proportion to the tension of the spring 34. On the other hand, if the pressure in pipe line 7 should tend to increase due to a decrease in flow through this line, an action of the slide valve 31, opposite to that described, would close communication between the port 39 and the annular groove 40 sufficiently to produce the given reduction in flow and still maintain the control pressure substantially constant and in proportion to the tension of spring 34.

A port 41 and exhaust pipe 42 are provided to prevent any possibility of the slide valve 31 ever being displaced an excessive amount to the right. If displacement of the slide valve 31 should ever occur to the right a sufficient extent beyond the closing of the annular groove or port 39 and open the port passage 41, the pressure in pipe line 7 and on the left-hand end of the plunger 35 would then be relieved by escape of liquid through said passage and the exhaust pipe 42 with suitable connection to the sump or reservoir 1 and thereby prevent further movement to the right-hand of said slide valve.

The control pressure in pipe line 7 is varied to suit the operating conditions by varying tension of the spring 34 which is caused by movements of the piston 30, which is slidably fitted in the bore 29 of the right-hand body section 43 of the valve 25. A shouldered head 44 at the inner end of the piston or plunger rod 45 supports the right-hand end of the spring 34.

When the machine is started with the temperature of the working liquid relatively cold, flow of liquid will take place through the pressure reducing valve 25 and adjusting valve 26, as well as the constant displacement pump 14 as before described, and the parts will soon be in equilibrium or in substantially the positions shown in Fig. I. It will now be seen that as the working liquid warms up, there will be an increase in pressure at point 46 in pipe 8 because of the fact that at the higher temperature of the working liquid a smaller pressure differential will be required to maintain the quantity of flow taken by the pump 14 in the circuit from passage 10 to said point, which includes the adjusting valve 26, because of the reduced viscosity and density of the working fluid at the higher temperature. If there has been no movement of piston 30 up to this point, the tension of spring 34 will be the same as it was before the working liquid warmed up and the pressure in passage 10 would also be the same, therefore with a reduced pressure differential between points 10 and 46 and the same pressure at 10, the pressure at point 46 will have been increased. This increase in pressure at point 46 is transmitted through a pipe 47 and passage 48 to the space 49 at the left-hand of the piston 30, causing a movement to the right of same which thereby reduces the tension of spring 34, which in turn reduces the pressure in the passage 10. This reduction in pressure in passage 10 will cause a corresponding reduction in pressure at point 46 and consequently in space 49 to the left-hand of the piston 30, so that after said piston has moved a certain distance to the right-hand, equilibrium will once more have been established with the pressure in passage 10 and main pipe line 7 somewhat reduced at the higher temperature of the working liquid. The action of this device as described would take place gradually and continue to gradually reduce the pressure in the pipe line 7 as the temperature of the working liquid increased.

The purpose of adjusting valve 26 which is fitted with a conventional screw-element 50 is to adjust the pressure in pipe line 7 to give a suitable mean working value. The pressure in pipe line 7 may be anything between a small amount less than that delivered to pipe 6 by the accumulator 3 and a small amount below that for which the relief valve 24 is set, depending upon the extent of opening of the valve 26 and proportions of the other parts comprising this device. In practice, the valve 26 would ordinarily be adjusted to give a pressure in the main pipe line 7 only a small amount less than the working pressure delivered by the accumulator 3 at the lowest temperature at which a machine equipped with this invention would be liable to be operated, in order to involve as little loss in passing through valve 25 as possible. Valve 26, when once correctly set, should never require further adjustment and for this reason could be replaced by a suitable orifice of the correct size placed within the pipe line 8 between the passage 10 and the intake connection 13.

The function of the device, which has so far been described, is to maintain in the pipe line 7 just such a mean pressure at any given temperature, within the practical working range of temperatures, as will give a velocity of movement to each of the various hydraulically operated members of the machine, tool slides in a machine tool for example, each through its respective control valve, of such an amount as will give the least average variation from a constant velocity of motion of all the members over the entire practical working range of velocities. In any given machine, embodying such a temperature compensating device, the most suitable pressure in pipe line 7 at any given operating temperature of the working liquid would have to be determined by actual test of the given machine at the given temperature. This device, as has so far been described, will probably not give a sufficient reduction in pressure in pipe line 7, with increase in temperature of the working liquid, to maintain the best average working velocities of the various hydraulically operated members of the machine, because the pressure differential which causes flow through the circuit from passage 10 to point 46 is only a part of the full pressure of pipe line 7 on account of the fact that the pressure at said point is an apreciable amount above atmospheric pressure. Inasmuch as the velocities of motion of the various hydraulically operated members of the machine are proportioned to the full pressure of pipe line 7 above atmospheric, as will be more fully brought out hereinafter, the actual amount of drop in pressure in pipe line 7 necessary to give a certain percentage variation to correct for the heating of the working liquid in maintaining a constant rate of flow through the various control valves of the machine would be a greater actual amount of pressure drop than would be obtained in the line from passage 10 to point 46 to effect the same percentage variation occasioned by the same temperature change in maintaining the constant rate of flow through this circuit, which is drawn by the constant displacement pump 14. Additional means for modifying this device, as so far described, may be employed to increase the pressure drop in pipe line 7 with a rise in temperature of the working liquid. A more exact method for increasing the pressure drop in pipe line 7 with increase in temperature, may be employed by use of the mechanism shown in Fig. II. This consists essentially of a valve 51 (Fig. II) for giving a variable area of opening in the discharge line of pump 14. Valve 51 is displaced by the movements of the piston or plunger 30, and is slidably fitted in a cylinder 52 which is mounted on the body section 43 of valve 25 of Fig. I. The area of opening between a groove 53 in the valve 51 and an annular port 54 formed in the valve cylinder 52 is small enough to build up a suitable pressure in pipe 20, with flow from the discharge end 19 of pump 14 taking place through the connecting pipes 20, 55, passages 56, 57, and extended pipe 21 which lead from pump 14 through the valve 51 and to the sump or reservoir 1. By varying the area of opening of valve 51, the discharge pressure at pump 14, may be made any desirable amount at any given position of piston 30. The area of opening of valve 51 may be varied with respect to the position of piston 30 by any suitable means, but preferably by means of some form of cam such as 58, as shown, which is fulcrumed at 58′ to a projection 52′ on the end of the valve cylinder 52, and moved angularly by movements of said plunger by means of the link 59 which connects the arm 60 of cam 58 with the head 61 formed at the end of piston rod 45 by means of the pins 62. Valve 51 is urged to the right, as viewed in Fig. II, by a spring 63 which causes cam roller 64, which is attached to the right-hand end of the valve 51 by means of the pin 65, to follow the contour of the cam 58. By providing a cam such as 58 for varying the area of opening of valve 51, its shape can be experimentally determined at every point so that it will produce such a pressure at point 46 as will give just the control pressure desired in pipe line 7 at every temperature of the working liquid within the operating range.

Fig. III is a further modification of valve 25 of Fig. I, for the purpose of effecting the required variation of pressure in pipe line 7 with change in temperature of the working liquid. This may be accomplished without the use of the pump 14, relief valve 24, or the valve 26. The mechanism within body section 43 of valve 25, Fig. I, only is modified. That within body sections 33 and 37 remain the same as shown in Fig. I. The modifications of the mechanism within body section, which is designated as 43, in Fig. III, consists in the lengthening of the bore 29, and the extending of the left-hand abutment 66 of piston or plunger 30, to make room for a spring 67. Also, an additional passage 68 is provided leading into the bore 29 of the body section 43 to the right of piston or plunger 30, with a restricted port 69 at the entrance to said bore. Passage 68 connects by means of pipe 70 to the main pressure line leading from the accumulator 3, this latter being pipe 6 in Fig. I. Passage 48 now serves merely as a vent to the atmosphere to allow free movements of the piston or plunger 30. Passage 28 connects by means of the pipe 71 to the reservoir 1 with an intermediate section of coiled tubing 72 of a relatively small diameter.

The operation of this modified variable pressure reducing valve 25, depends upon the principle that the percentage difference in the pressure differential necessary to cause hydraulic flow through an appreciable length of pipe or tubing of a sufficiently small diameter to produce a relatively high velocity of flow through same, will vary considerably more with a variation in temperature than will the percentage difference in the pressure differential necessary to cause hydraulic flow of the same hydraulic medium at a given velocity through a valve opening or short passage of restricted area under the same temperature conditions.

The operation of this modified valve 25″ may be more fully understood by reference to Fig. V, which is a graphical representation of the pressures in the space 29 to the right of piston 30 involved in the operation of said valve. In Fig. V, 73 and 74 represent the line of zero or atmospheric pressure existing in reservoir 1, while line 75, 76 represents the working pressure as supplied by the accumulator 3. 76, 77 represents the pressure differential necessary to cause flow from the accumulator 3 through restricted passage 69 to space 29 when the temperature of the working liquid is at the lowest point in its working range, and 77, 73 represents the pressure differential necessary to cause flow from space 29 through the coiled tube 72 to reservoir 1 at the same temperature. 75, 78 represents the pressure differential necessary to cause flow past restriction 69 when the temperature of the working liquid is at its highest point in its working range, but at the same velocity as in the former case. 79, 74 represents the pressure differential necessary to cause flow through coil 72 when the temperature is at the same maximum point but with the velocity of flow the same as that at the minimum temperature. At the minimum temperature, the pressure exerted in space 29 to the right of piston 30 is represented by 77, 73. At the maximum temperature, the rate of flow through the connecting pipes and passages from 70 to 71, inclusive, will have increased to cause an increase in the values of 75, 78 and 74, 79 until an equilibrium point 80 is reached at which 75, 78 will have increased to 75, 80 and 74, 79 will have increased to 74, 80. At the maximum temperature, the pressure exerted in space 29 to the right of piston 30 will be the value represented by 74, 80. The percentage increase of 75, 80 over 75, 78 will be considerably greater than the percentage increase of 74, 80 over 74, 79, because of the fact that at a given temperature the pressure differential necessary to cause hydraulic flow through a restricted passage varies substantially as the square of the velocity, whereas at a given temperature the pressure differential necessary to cause hydraulic flow in a pipe of given length and diameter will vary approximately as the first power of the velocity, if the conditions of flow be what is known as "streamline flow" under both conditions, which condition would obtain in this case. Thus it may be seen that the actual amount of increase in pressure from 74, 79 to 74, 80 would be somewhat less than the amount of increase in pressure from 75, 78 to 75, 80, and that the pressure 74, 80 which is exerted in space 29 to the right of piston 30 at the maximum temperature is appreciably less than the pressure 77, 73 exerted therein at the minimum temperature. By properly proportioning the parts of this modified variable pressure reducing valve 25 and coil 72 with respect to each other, any two desired pressures may be had in the main pipe line 7 at any two given temperatures to effect the desired temperature compensation at these two temperatures, but not necessarily at other temperatures within the working range, as the characteristics of this modified valve 25 may not give exactly the desired pressure in pipe line 7 at every temperature within the working range. However, by properly choosing the control pressures in the pipe line 7 at the two temperatures, the maximum and minimum working temperatures for example, a fairly close approximation to the desired values of the control pressure in said pipe line at all temperatures in between may probably be obtained.

Fig. IV shows a further modified form of the variable pressure reducing valve 25 of Fig. I. This modified valve, which is conveniently designated as 25, combines the principles of those shown in Figs. II and III, so as to utilize the advantages of both, i. e., it does away with the necessity of using pump 14, relief valve 24, and adjuster valve 26, and at the same time makes it possible to obtain any desired control pressure in the main pipe line 7 at any given temperature of the working liquid within the operating range. The parts of this valve mechanism corresponding with or similar to those of Figs. I, II and III, bear the same numerals.

The principle of operation of the valve 25 is the same as that of the valve shown in Fig. III, but the cam operated valve 51 of Fig. II is added to give the same advantages as obtained by its use in connection therewith. Pipe 70 connects to the main pressure line 6 from the accumulator 3. A flow of the working liquid takes place during the operation of the machine through the pipe 70, and the connecting passages 56, 68, 28, with associated pipe 71 and small diameter coil 72 to the sump or reservoir 1. The shape of cam 58 can be experimentally determined at every point so that it will produce such a pressure in space 29 to the right of piston 30 as will give just the control pressure desired in pipe line 7 at every temperature of the working liquid within the operating range.

In Fig. I, 81 and 82 represent motors, being shown as hydraulic cylinders in this instance. They are each shown connected to a different type of flow control valve mechanism. The two types of control valve mechanism shown therein are typical of most of the valve mechanisms in common use in hydraulically operated machines embodying what is known as the "open circuit," i. e., those which receive working liquid from a source of constant pressure and discharge into an open sump or reservoir from whence the liquid is again drawn back into the pressure source. Inasmuch as the previously described temperature compensating valve mechanisms are suitable for use only in hydraulic applications embodying the open circuit type of operation, a description of the use of said temperature compensating valve mechanisms in connection with these two general types of flow control valve mechanisms as shown in Fig. I, which are in common use in this field, should suffice to cover most applications to which the temperature compensating devices would be applied. While Fig. I shows only one valve mechanism of each type with its motor 81 or 82, it is understood that most applications of these temperature compensating devices may embody several controls of either or both types, or possibly other types, than those illustrated.

In Fig. I, an adjuster valve 83 is connected between pipe line 7 and the motor 81 by means of the pipes 84 and 85, and which is one of the simplest forms of flow control means used in an open circuit. This type of valve 83, which may be any suitable form having an adjuster needle or throttle 86, is sometimes used where a close control of the velocity of motion of the motor 81 is not required with variable resistance to motion of same. When the resistance to motion of the motor 81 is very small, however, or when this combination is used merely as a timing device a very close control of the velocity of motion of said motor may be obtained at any given temperature of the working liquid.

It should be pointed out that the main pipe line 7 must be of comparatively large diameter so that even at the maximum rate at which liquid flows through it the velocity is sufficiently low that the loss of pressure from valve 25 to any point due to flow therein may be negligibly small. Pipes 84, 85 and associated passages 87, 88 which connect to pipe line 7 and lead through the valve 83 to the intake of motor 81, and passage 89 with pipe 90 which lead from the discharge end of said motor to the reservoir 1, should all be also sufficiently large that at the maximum rate of flow therein the pressure drop due to pipe losses may be negligibly small. With these requirements met, it may readily be seen that substantially the full amount of pressure in pipe line 7 above atmospheric is utilized in forcing the working liquid through the restricted opening of valve 83 in imparting motion to the movable member or piston 91 of motor 81. In other words the velocity of motion of the movable member or piston 91 of motor 81 is a function of the full control pressure of pipe line 7. At any given temperature and control pressure of the working liquid in pipe line 7, the velocity of motion of piston 91 will be proportional to the area of opening of the valve 83, if this area of opening be kept within reasonable operating limits. Now if, for any given opening of the valve 83, the control pressure in pipe line 7 should be varied with a change in temperature of working liquid, by one of the temperature compensating devices, which has already been described, in such a way as to give a fixed or invariable velocity of movement to movable member or piston 91 of the motor 81 at any temperature within the operating range, the temperature compensation would then be the correct and desired amount at each temperature within the range. This result could be very closely attained by use of either one of the types of temperature compensating valve mechanism shown in Figs. I and II or Figs. I and IV, and with suitably sized pipes and passages at the proper points as previously described, a very close temperature compensation could be had at all openings of the valve 83 within a reasonable operating range.

In Fig. I, the valve comprehensively designated as 92 is a hydraulic flow regulating valve. The principles underlying its operation are in common use and are generally understood by those skilled in the art. The specific construction and method of use of this valve, shown herein, are described in a companion application, Serial Number 106,-

387, filed concurrently herewith. Flow regulating valve 92 is used in connection with the flow control valve 93 in controlling the velocity of movement of the movable member or piston 94 of the motor 82. The main purpose for using the flow regulating valve 92 is to make possible the maintaining of a constant velocity of motion of the piston member 94 of motor 82 regardless of the operating resistance to motion with which it is met. The valve 92 consists essentially of a valve spindle 95 with a piston 96 formed integrally therewith, both being slidably fitted within the valve body 97. The spaces 98, 99 to the right and left respectively of piston 96 are connected to valve 93. Space 98 connects by means of the passages 100, 101 with pipe 102 to passage 103 of valve 93 while space 99 connects by means of passage 104, pipe 105 and branch pipe 106 with which said pipe connects at point 107, to passage 108 under control of the needle element 109 of valve 93. An extension 110 of the pipe 106 connects with or communicates into a passage 111 which is the intake to motor 82. The discharge passage 112 of motor 82 connects with a pipe 113 which leads to the reservoir 1. Another pipe 114 connects at point 115 with the main pressure line 6, leading from the accumulator 3, and communicates, at its other end, into a port 116 in the body 97 of the valve 92. A small cylinder 117 is provided at the left-hand end of valve body 97, and in it is slidably fitted a small piston 118, which abuts the left-hand end 119 of the valve spindle 95. The space 120 to the left of piston 118 connects, by means of a passage 121 and pipe 122 with the pipe line 7 from valve 25. In practice the motors of a hydraulically operated machine such as 81 and 82 would ordinarily be connected to the main pressure line through suitable valves for connecting either end of same to the main pressure line 6 or to their control valves, such as the ones described, to enable them to produce a rapid motion or a slower controlled motion in either direction, or to stop entirely at the will of the operator. Such valve arrangements are well understood by those skilled in the art and, as they form no part of this invention, it is deemed unnecessary to give a detailed description thereof herein.

When it is desired to impart a controlled motion to the movable member 94 of the motor 82, a flow of the working liquid is allowed to take place from the main pressure line 6 through pipe 114, passage 116, groove 123 in the valve spindle 95, annular port 124, passage 101, pipe 102, passage 103, past the needle restricted opening of the valve 93, passage 108, pipes 106 and 110, and passage 111 leading into the intake side of motor 82 to thereby impart motion to the movable member or piston 94. In flowing past the restricted opening of the valve 93 a drop in pressure, or a pressure differential, is created between the "upstream" and "downstream" passages 103 and 108, respectively. The pressure in passage 103 is transmitted through the pipe 102 and passages 101, 100 to the space 98 to the right of piston 96. The pressure in passage 108 is transmitted through the pipes 106 and 105 to passage 104, leading to the space 99 to the left of piston 96. As the pressure at passage 103, with any given flow from pipe 114 to the intake side of motor 82 as described, will be greater than the pressure at passage 108, the resultant force on piston 96 of valve 92 produced by the pressure differential will tend to move said piston to the left, as viewed in Fig. I. This tendency to movement of valve piston 96 will be resisted by the force produced on the small piston 118 by the pressure within the space 120 to the left of same, which is transmitted from the main pipe line 7 through the branch pipe 122 and passage 121. In normal operation the valve 92 is automatically positioned axially by the opposing pressures existing on the opposite sides of its piston 96 so as to produce a net force at said piston that will just balance the force produced on the small piston 118 by the controlling pressure of the pipe line 7. This balancing action in positioning valve 92 determines the pressure differential between the "upstream" and "downstream" passages of the flow control valve 93, or more strictly speaking between the outer end 125 of the passage 100 and the point 107, respectively, of the "upstream" and "downstream" lines, for the pressures that are transmitted to the spaces 98 and 99 at the right and left sides, respectively, of piston 96 are the same as the pressures at these two points, for in normal operation of valve 95 there is no flow of liquid in the passage 100 connecting the end 125 with the space 98 to the right of piston 96 and likewise there is no flow of liquid in the pipe 105 and the passage 104 which connects the point 107 with space 99 to the left of the piston 96. In operation of the flow regulating valve 92, the proportions are such that there is ordinarily a considerable pressure drop or differential necessary to cause flow through the opening between the groove 123 of the valve 95 and the annular port 124 in the valve housing 97, which opening is determined by the position of the valve 95 and its piston 96. Variations in this pressure differential caused by movements of the piston 96 and valve 95 produce a regulating action to maintain a balance between the pressure differential existing between the points 125 and 107 tending to move the piston 96 to the left and the control pressure in the pipe line 7 tending to move said piston to the right. This balancing action is effective at all times, during operation of the regulating valve 92, to maintain the pressure differential between the points 125 and 107, of the "upstream" and "downstream" lines, respectively, of the flow control valve 93, at all times in proportion to the control pressure in the pipe line 7. In other words, the magnitude of the control pressure existing in the pipe line 7 determines the magnitude of the pressure differential existing between the points 125 and 107 of the "upstream" and "downstream" lines respectively of the flow control valve 93. That this condition is maintained regardless of the resistance to motion met with my movable member or piston 94 may be more readily understood if a description of the regulating action of valve 95 in maintaining a constant pressure differential between points 125 and 107 under a variation in resistance to motion of movable member or piston 94 is given. With the movable member or piston 94 in motion at a uniform rate against a uniform resistance as a result of flow of the working liquid through the flow regulating and control valves 92 and 93, respectively, valve 95 and its piston 96 will have assumed a position of equilibrium. If now the resistance to motion of the piston 94 is increased, its velocity of motion will slightly decrease temporarily causing thereby a slightly reduced rate of flow past the control valve 93. This reduced velocity of flow past the control valve 93 will produce a reduced pressure differential between the points 125 and 107 which will cause an increase in the "downstream" pressure of the valve 93 to help overcome the greater resistance to motion met with by the piston 94, and at the same time will cause piston 96 and its valve 95 to move slightly to the right to increase the opening between the groove 123 and the annular port 124 to reduce the pressure differential at this point and thereby increase the pressure differential at the valve 93 and also still further increase the "downstream" pressure of said valve. This action will continue until the "downstream" pressure of the valve 93, or the pressure at the intake 111 to motor 82, is sufficiently increased to overcome the greater resistance to motion met with by its movable member or piston 94 and until the pressure differential between the points 125 and 107 is restored to its former value and is again substantially proportional to the control pressure in the pipe line 7. If the resistance to motion of the piston 94 should decrease an action of the valve spindle 95 of the regulating valve 92 opposite to that described would take place to reduce the pressure at the intake to motor 82 to balance the lowered resistance to motion of the piston 94 and to still maintain the pressure differential between the points 125 and 107 substantially proportional to the control pressure in the pipe line 7. It has now been shown that the pressure differential of the valve 93 is maintained substantially constant and proportional to the control pressure of the pipe line 7 regardless of the operating resistance to motion to be overcome by the motor 82. If the connecting pipe 102 and passages 101, 103 leading from point 125 at the end of passage 100 to the control valve 93 and passage 108 and branch pipe 106 leading from the valve 93 to the point 107, are sufficiently large so that the pressure drop caused by flow through them at the maximum operating opening of the valve 93 is negligibly small, then the rate of flow of the working liquid through said flow control valve 93 and the corresponding velocity of movement of the piston 94 are, for any given temperature of the working liquid a function of the pressure differential between the points 125 and 107, and are therefore a function of the full control pressure of the pipe line 7, above the atmospheric, as the pressure differential between the points 125 and 107 is always proportional to the control pressure of said pipe line. With the connecting pipes and passages of suitable size as just mentioned, the rate of flow through the control valve 93 obeys the same law with respect to the pressure differential between points 125 and 107, which is proportional to the control pressure in the pipe line 7, as the rate of flow through control valve 83 obeys with respect to the full control pressure of the pipe line 7. Consequently the percentage variation in velocity of motion of the motor 82 controlled by the valve 93 and of motor 81 controlled by the valve 83 as a result of variation in pressure in the pipe line 7 due to temperature changes would be, for given openings of the valves 83 and 93, the same for both for the given variation in temperature of the working liquid. This being true it readily follows that the same variation in the control pressure of the pipe line 7 necessary to maintain a constant velocity of movement of the motor 81 for a given variation in temperature of the working liquid would also maintain substantially constant the velocity of motion of the motor 82, or any other motors of a given machine that may be so controlled, and all being connected to a common control pressure line such as the pipe line 7.

By using either one of the two types of temperature compensating device shown in Figs. I and II, or Figs. I and IV, a substantially constant velocity may be obtained for all motors of such a hydraulically operated machine, at any temperature of the working liquid within the operating range of temperatures and with suitably sized pipes and passages at the proper points, as has been hereinbefore described, a constant velocity of movement could be obtained with any of the motors of such a machine not only at any temperature within the temperature range but also at any given opening of its associated control valve within a reasonable operating range of openings. Such a hydraulically operated machine would give substantially the same performance under all operating conditions regardless of the temperature of the working liquid.

From the foregoing description, it will be readily seen that, by this invention, there is provided a device that positively fulfills the objects set forth; and while this specification sets forth in detail preferred means to accomplish such objects, still in practice deviations from the precise disclosure may be resorted to without departure from the spirit and scope of said invention as defined by the following claims.

Having thus described my invention, I claim:

1. In a temperature compensating device for controlling hydraulic flow, the combination of a source of working liquid at constant pressure, main and branch pipe lines for supplying said flow as operating medium to a work unit or units, a variable pressure reducing valve including axially aligned end and intermediate cylinder sections, one of the end cylinder sections having a piston defining spaces therein, the outer one of which communicates with an intake connection from said source with a fixed restriction therein and a discharge connection to a reservoir, said piston having its inner end shouldered to accommodate a compression spring, a circumferentially grooved slide valve in the intermediate valve section with a resilient connection between said slide valve and said piston, said slide valve constituting the movable or controlling part of the variable pressure reducing valve which varies the control pressure to the work unit or units by way of inlet and outlet passages in the intermediate section, a plunger in the other end section of the variable pressure reducing valve for coaction with the slide valve aforesaid, a by-pass in the last mentioned section for diverting pressure from the main pipe line to the rear of said plunger, and a coil section in the discharge connection to the reservoir of relatively small diameter, for the purpose specified.

2. In a temperature compensating device for controlling hydraulic flow, the combination of a source of working liquid at constant pressure with means adapted to vary, with change in temperature of the working liquid, the control pressure to a work unit or units in circuit therewith so as to maintain a substantially constant velocity of flow to same, said means embodying a cylinder and operating piston therein, a coiled spring acting on one end of said piston, a conduit from the source of constant pressure leading through a variable intake valve to said cylinder at the opposite end of said piston, said intake valve being varied by movements of said operating piston, a discharge conduit leading from the said cylinder at the last named end of said operating piston to a sump or reservoir, and a coiled section of tubing of relatively small diameter included in said discharge conduit.

3. The combination of claim 1 wherein the means adapted to vary the control pressure comprises a variable pressure reducing valve.

4. The combination of claim 2 wherein the means operative to effect actuation of the variable intake valve comprise a cam having a section engaging the outer end of said valve to impart movement to same, said cam being operatively coupled to the variable pressure valve piston rod projecting end, for the purpose specified.

5. The combination of claim 2 wherein the means operative to effect actuation of the variable intake valve comprise an angularly rockable fulcrumed cam, said cam having an experimentally determined rise, an integrally formed arm with a linkage at its free end operatively coupled to the variable pressure valve piston rod projecting end, for the purpose specified.

6. In a temperature compensating device for controlling hydraulic flow, the combination of a source of working liquid at constant pressure, main and branch pipe lines for supplying said flow as operating medium to a work unit or units, a variable pressure reducing valve including axially aligned end and intermediate cylinder sections, one of the end cylinder sections having a piston defining spaces therein, the outer one of which communicates with a variable intake valve in a connection from said source and a discharge connection including a coil section of relatively small diameter leading to a reservoir, said piston having its inner end shouldered to accommodate a compression spring, a circumferentially grooved slide valve in the intermediate valve section with a resilient connection between said slide valve and said piston, said slide valve constituting the movable or controlling part of the variable pressure reducing valve which varies the control pressure to the work unit or units by way of inlet and outlet passages in the intermediate section, a plunger in the other end section of the variable pressure reducing valve for coaction with the slide valve aforesaid, a by-pass in the last mentioned section for diverting pressure from the main pipe line to the rear of said plunger, and said variable intake valve being actuated by suitable cam and linkage from the projecting piston rod end of said piston.

GILBERT V. ANDERSON.